Aug. 10, 1965    W. J. BLANKEMEYER    3,199,631
BRAKE ALARM
Filed June 21, 1963
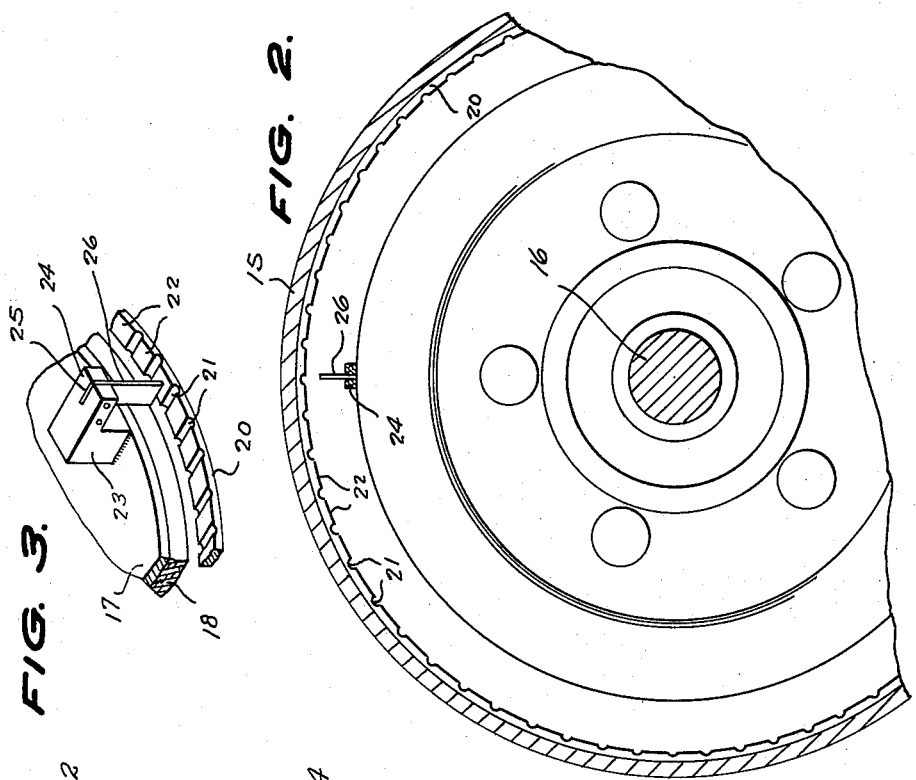
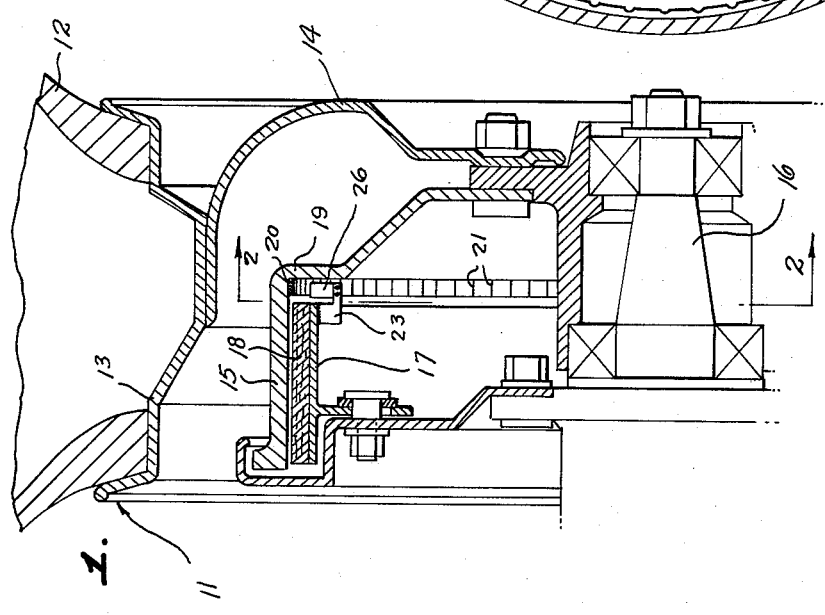
INVENTOR.
WILLIAM J. BLANKEMEYER,
BY
McMorrow, Berman & Davidson
ATTORNEYS.

United States Patent Office 3,199,631
Patented Aug. 10, 1965

3,199,631
BRAKE ALARM
William J. Blankemeyer, 1715 E. 4th St., Ottawa, Ohio
Filed June 21, 1963, Ser. No. 289,557
5 Claims. (Cl. 188—1)

This invention relates to motor vehicle brake mechanisms, and more particularly to means to provide an audible signal when a brake shoe lining has been worn down a predetermined amount.

A main object of the invention is to provide a novel and improved brake lining wear indicating alarm device which is relatively simple in construction, which involves only a few parts, and which provides a characteristic distinct audible signal which serves to indicate that the associated brake lining has been worn down to a degree wherein it should be replaced.

A further object of the invention is to provide an improved brake shoe wear alarm device which is inexpensive to fabricate, which is reliable in operation, which is extremely durable, and which provides a distinctive audible alarm signal when the associated brake lining has been worn down excessively, thus indicating the need for replacement thereof and eliminating the risk of damage to braking surfaces which would otherwise occur due to the complete wearing away of the brake linings.

Further objects and advantages of the invention will become apparent from the following description and claims, and from the accompanying drawings, wherein:

FIGURE 1 is a fragmentary transverse vertical cross sectional view taken through a portion of a motor vehicle wheel, including a portion of its associated brake drum and related portions of the brake assembly, the assembly being provided with an improved wear-indicating means according to the present invention.

FIGURE 2 is a vertical cross sectional view taken substantially on the line 2—2 of FIGURE 1.

FIGURE 3 is a fragmentary perspective view showing the relative positions of the radially extending leaf spring and the cooperating serrated rib, as employed in the assembly of FIGURES 1 and 2.

Referring to the drawings, 11 generally designates a motor vehicle wheel of the type provided with a pneumatic tire 12 which is mounted on a rim 13 of the drop-center type and which includes a hub portion 14 to which is secured the brake drum 15. The wheel 11 is rotatably mounted on an axle 16, and operatively associated with the brake drum 15 is a brake shoe assembly of substantially conventional construction which includes at least one brake shoe 17 having a brake lining 18 adapted to be engaged with the inside surface of the drum 15 to provide braking action on the wheel 11.

The structure thus far described is entirely conventional and in itself forms no part of the present invention. It will, of course, be understood that after a period of use, the brake lining 18 becomes worn down, and eventually, replacement thereof is necessary, since when the lining 18 is completely worn, the metal surfaces of the shoe 17 and the brake drum 15 are engageable with each other, whereby serious damage may be caused to such surfaces.

In accordance with the present invention, the brake drum 15 is provided at its inner anular corner 19 with an inwardly facing serrated rib 20, the rib being, for example, formed with uniformly spaced transverse grooves 21, as shown in FIGURE 2, defining the spaced serrations 22. The rib 20 is rigidly secured in the drum 15 and therefore rotates therewith.

Designated at 23 is a generally L-shaped bracket member which is rigidly secured to the margin of the brake shoe 17 adjacent the rib 20 and which is formed with an outwardly projecting arm 24 extending horizontally and laterally from the drum 15 adjacent and within the annular rib 20. The arm 24 is longitudinally slotted at 25, and secured in the slot is one end of a radially extending leaf spring 26 which terminates a short distance beyond the cylindrical surface containing the interface between the external periphery of the shoe 17 and the inner surface of the lining 18. For example, the leaf spring 26 may terminate 1/16 of an inch beyond the cylindrical surface containing said interface. Therefore, when the brake lining 18 has been worn down to a thickness of approximately 1/16 of an inch, the application of the brake causes the end of the leaf spring 26 to come into contact with the serrations 22 of rib 20 and to vibrate said leaf spring responsive to the rotation of the wheel 11, so as to produce a relatively loud clicking sound. When this loud clicking sound is heard by the operator of the vehicle, upon application of the brakes, it serves as an indication that the brake lining 18 has been worn down to a point wherein it is necessary and desirable to replace said brake lining. This will allow the brake lining to be replaced or repaired before the brake shoe 17 can engage the inside surface of the brake drum 15, thus eliminating and preventing damage to the interengaging metal surfaces and eliminating costly repairs due to such damage.

Heretofore in order to determine the condition of brake linings, it has been necessary to remove the associated brake drums 15, since the linings are completely covered by the drums and are not visible without removal of the drums. The removal of the drums is usually relatively difficult and in many cases is a relatively costly process. The alarm device of the present invention enables the worn down condition of the brake linings to be detected as soon as the linings have been worn to a degree requiring replacement or repair of the linings, without the necessity of removing the brake drum 15.

The arrangement disclosed above and illustrated in the drawings is applicable not only to motor vehicles, but also to other equipment employing wearable brake linings, and may be used not only where the brake shoes are inside a brake drum, but also in systems wherein outside contact of a braking element with a drum or similar member is employed to obtain braking action.

While a specific embodiment of an improved brake signal device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a brake assembly, an annular brake drum having a braking surface, annularly arranged serrations adjacent said braking surface, a brake shoe operatively mounted to engage said braking surface and having a brake lining, and a flexible leaf spring mounted on said shoe and extending laterally therefrom in a position to cause the edge thereof to engage said serrations when the brake lining is worn down a predetermined amount, whereby to provide an audible warning signal.

2. In a brake assembly, an annular brake drum having an internal braking surface, annularly arranged serrations adjacent said braking surface, a brake shoe operatively mounted within said drum and having a brake lining, and a flexible leaf spring mounted on said shoe and extending laterally therefrom in a position to cause the edge thereof to engage said serrations when the brake lining is worn down a predetermined amount, whereby to provide an audible warning signal.

3. In a brake assembly, an annular brake drum having an internal braking surface, annularly arranged serrations adjacent said braking surface, a brake shoe operatively mounted within said drum, said brake shoe comprising a rigid arcuate supporting body arranged substantially concentrically with said drum and provided with a brake lining on the arcuate outer surface of said supporting body movable into braking contact with said braking surface, and a substantially radially extending leaf spring mounted on said supporting body and extending laterally therefrom in a position to cause the edge thereof to engage said serrations when the brake lining is worn down a predetermined amount, whereby to provide an audible warning signal.

4. In a brake assembly, an annular brake drum having an internal braking surface, an annular rib in said drum adjacent and coaxial with said braking surface, and being formed with serrations, a brake shoe operatively mounted within said drum, said brake shoe comprising a rigid arcuate supporting body arranged substantially concentrically with said drum and provided with a brake lining on the arcuate outer surface of said supporting body movable into braking contact with said braking surface, bracket means on said supporting body extending laterally therefrom inwardly adjacent said serrations, and a substantially radially extending leaf spring on said bracket means arranged in a position such that its outer edge is engageable with said serrations when the brake lining is worn down a predetermined amount, whereby to provide an audible warning signal.

5. In a brake assembly, an annular brake drum having an internal annular braking surface, an annular rib in said drum adjacent and coaxial with said braking surface and being formed with serrations, a brake shoe operatively mounted within said drum, said brake shoe comprising a rigid arcuate supporting body arranged substantially concentrically with said drum and being provided with a brake lining on the arcuate outer surface of said supporting body movable into braking contact with said braking surface, a laterally extending rigid bracket on said supporting body having a horizontal arm portion extending inwardly adjacent said annular rib, and a substantially radially extending leaf spring secured to said arm portion and having a free outer edge engageable with said serrations when the brake lining is worn down a predetermined amount, whereby to provide an audible warning signal.

References Cited by the Examiner

UNITED STATES PATENTS 2,087,386  7/37  Norton.

ARTHUR L. LA POINT, *Primary Examiner.*
DUANE A. REGER, *Examiner.*